US012630041B2

(12) United States Patent
     Haupt

(10) Patent No.: US 12,630,041 B2
(45) Date of Patent: May 19, 2026

(54) SYSTEM AND METHOD FOR INDIVIDUALIZED PLANNING OF CHARGING STOPS OF AN AT LEAST PARTIALLY ELECTRICALLY POWERED VEHICLE

(71) Applicant: Bayerische Motoren Werke Aktiengesellschaft, Munich (DE)

(72) Inventor: Michael Haupt, Kirchheim bei Muenchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 752 days.

(21) Appl. No.: 17/992,377

(22) Filed: Nov. 22, 2022

(65) Prior Publication Data

US 2023/0158916 A1    May 25, 2023

(30) Foreign Application Priority Data

Nov. 24, 2021    (DE) ..................... 10 2021 130 780.5

(51) Int. Cl.
| | |
|---|---|
| *H02J 7/00* | (2026.01) |
| *B60L 53/60* | (2019.01) |
| *B60L 53/66* | (2019.01) |
| *B60L 53/67* | (2019.01) |
| *B60L 53/68* | (2019.01) |

(Continued)

(52) U.S. Cl.
CPC .............. *B60L 53/66* (2019.02); *B60L 53/60* (2019.02); *B60L 53/67* (2019.02); *B60L 53/68* (2019.02); *G01C 21/3453* (2013.01); *B60L 53/30* (2019.02); *B60L 2240/72* (2013.01); *Y02T 90/12* (2013.01); *Y02T 90/16* (2013.01)

(58) Field of Classification Search
CPC .......... B60L 53/66; B60L 53/60; B60L 53/67; B60L 53/68; B60L 53/30; B60L 2240/72; G01C 21/3453; Y02T 90/12; Y02T 90/16
USPC ............................................. 320/109; 701/22
See application file for complete search history.

(56) References Cited

U.S. PATENT DOCUMENTS

| | | | |
|---|---|---|---|
| 2010/0268411 A1 | 10/2010 | Taguchi | |
| 2016/0124050 A1* | 5/2016 | Hua ........................ | B60L 53/68 |
| | | | 320/109 |

(Continued)

FOREIGN PATENT DOCUMENTS

| | | |
|---|---|---|
| DE | 10 2010 003 872 A1 | 10/2010 |
| DE | 10 2015 210 325 A1 | 12/2016 |
| DE | 10 2016 218 303 A1 | 3/2018 |

OTHER PUBLICATIONS

German-language Office Action issued in German Application No. 10 2021 130 780.5 dated Aug. 12, 2022 (six (6) pages).

*Primary Examiner* — Zixuan Zhou
(74) *Attorney, Agent, or Firm* — Crowell & Moring LLP

(57) ABSTRACT

A system for robustly detecting faulty operating states of charging stations includes a backend and an at least partially electrically powered vehicle. The at least partially electrically powered vehicle includes a detection unit configured to detect a faulty operating state of a charging station with respect to a charging operation at the charging station, and a communication unit configured to transmit a message data set comprising the detected faulty operating state of the charging station to the backend. The backend is configured to use the message data set to determine a unique identification of the charging station having the detected faulty operating state.

10 Claims, 2 Drawing Sheets

200

Detection, via a detection unit of a vehicle, of a faulty operating state of a charging station with respect to a charging operation at the charging station — 210

Transmission, via a communication unit of the vehicle, of a message data set comprising the detected faulty operating state of the charging station to a backend — 220

Determination, via the backend, of a unique identification of the charging station having the detected faulty operating state — 230

Provision, via the backend, of data relating to the identified charging station having the detected faulty operating state via a points-of-interest database — 240

Transmission, via the backend, of data relating to the identified charging station having the detected faulty operating state to a navigation system of an at least partially electrically powered vehicle — 250

(51) Int. Cl.
     *G01C 21/34*      (2006.01)
     *B60L 53/30*      (2019.01)

(56)               References Cited

U.S. PATENT DOCUMENTS

2018/0086221 A1      3/2018   Bouard et al.
2019/0232813 A1*     8/2019   Kusumi ............... B60L 53/305
2023/0098157 A1*     3/2023   Hou ..................... B60L 53/305
                                                           320/109

* cited by examiner

100

Charging station                    150

110

112

114

116

130

120

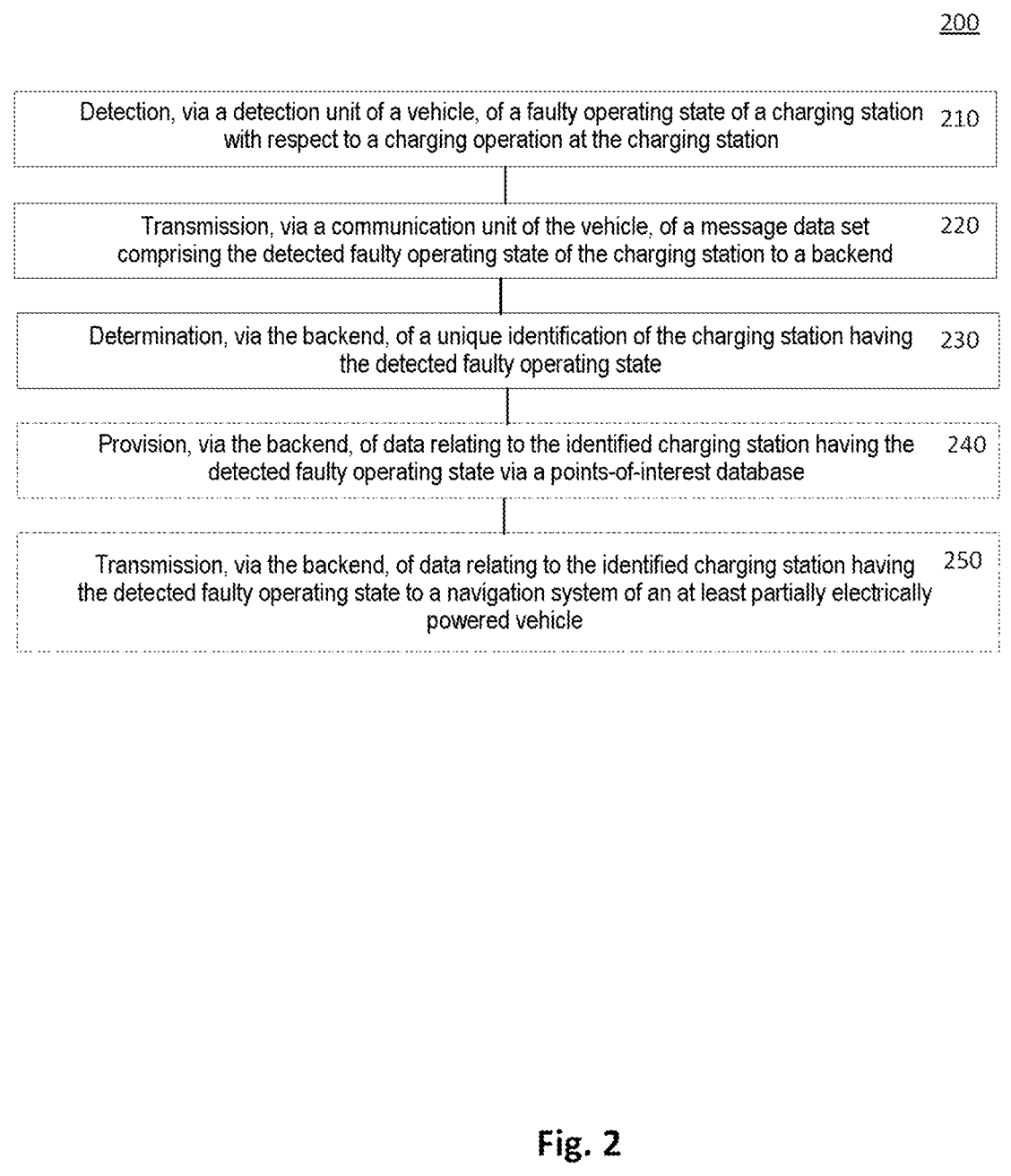

200

Detection, via a detection unit of a vehicle, of a faulty operating state of a charging station   210
with respect to a charging operation at the charging station Transmission, via a communication unit of the vehicle, of a message data set   220
comprising the detected faulty operating state of the charging station to a backend Determination, via the backend, of a unique identification of the charging station having   230
the detected faulty operating state Provision, via the backend, of data relating to the identified charging station having the   240
detected faulty operating state via a points-of-interest database Transmission, via the backend, of data relating to the identified charging station having   250
the detected faulty operating state to a navigation system of an at least partially electrically
powered vehicle

Fig. 2

SYSTEM AND METHOD FOR INDIVIDUALIZED PLANNING OF CHARGING STOPS OF AN AT LEAST PARTIALLY ELECTRICALLY POWERED VEHICLE

CROSS REFERENCE TO RELATED APPLICATION

This application claims priority under 35 U.S.C. § 119 from European Patent Application No. DE 10 2021 130 780.5, filed Nov. 24, 2021, the entire disclosure of which is herein expressly incorporated by reference.

BACKGROUND AND SUMMARY

The present invention relates to a system and method for individualized planning of charging stops of an at least partially electrically powered vehicle.

For users of at least partially electrically powered vehicles, but especially for users of purely electrically powered vehicles, it is essential to have a reliable network of charging stations available at which the electrical energy storage device can be charged. At the same time, it is advantageous for users, especially when longer distances or routes are concerned, during which the electric energy storage unit has to be charged to reach the destination, to approach charging stations having relatively short charging times so that the route destination can be reached as quickly as possible. However, an infrastructure available at the charging post can also be of importance to the user of the vehicle during the duration of the charging operation. It is known to provide status information about charging stations as points-of-interest (POIs) in a database, which can be accessed via a navigation device to enable the user of the vehicle to search for a suitable and available charging station. The problem here is that, due to the prevailing heterogeneity with respect to charging posts as well as a lack of standardization, no information or only insufficient information is provided via the POI databases about the operating status and/or reliability and/or operability of the charging stations and/or about an existing infrastructure surrounding a charging station. A lack of or non-existent operational capability and/or reliability of charging stations can result in electrically powered vehicles not being able to be charged or being only partially charged, which can result in a planned trip not being able to be started or completed, or in insufficient electrical energy being available to drive to another charging post. A non-existent infrastructure at a charging post also has the disadvantage that the user of the at least partially electrically powered vehicle has to "wait out" the charging operation while it is taking place.

The object of the invention is to provide a solution that allows individualized, time-optimized planning of charging stops of at least partially electrically powered vehicles.

This object is achieved in accordance with the claimed invention.

The above-mentioned object is achieved by a system for robustly detecting faulty operating states of charging stations configured to provide electrical energy for the charging of vehicles, comprising:

a backend; and
an at least partially electrically powered vehicle, comprising:
   a detection unit configured to detect a faulty operating state of a charging station with respect to a charging operation at the charging station; and a communication unit configured to transmit a message data set comprising the detected faulty operating state of the charging station to the backend;
wherein the backend is configured to use the message data set to determine a unique identification of the charging station having the detected faulty operating state.

Within the scope of the document, the term "vehicle" includes mobile transport devices that serve to transport people (passenger transport), goods (goods transport) or tools (machines or tools) and are at least partially electrically powered (electric car, hybrid vehicles). The vehicle can be in particular an electric car or a plug-in hybrid, but also any other at least partially electrically powered electric vehicle, such as an at least partially electrically powered truck or bus, an electrically powered two-wheeler or an electrically powered scooter.

The vehicle can be controlled by an operator or driver of the vehicle. In addition or alternatively, the vehicle can be an at least partially automated driving vehicle. In the context of the document, the term "automated driving vehicle" or "automated driving" can be understood to mean driving with automated longitudinal or lateral guidance or autonomous driving with automated longitudinal and lateral guidance. Automated driving can be, for example, driving on the highway for a longer period of time or driving for a limited period of time in the context of parking or maneuvering. The term "automated driving" includes automated driving with any degree of automation. Exemplary degrees of automation are assisted, partially automated, highly automated or fully automated driving. These degrees of automation have been defined by the German Federal Highway Research Institute (BASt) (see BASt publication "Forschung kompakt", issue November 2012). In assisted driving, the driver permanently performs longitudinal or lateral guidance, while the system takes over the other function within certain limits. In partially automated driving, the system takes over longitudinal and lateral guidance for a certain period of time and/or in specific situations, with the driver having to monitor the system permanently, as in assisted driving. In highly automated driving, the system takes over longitudinal and lateral guidance for a certain period of time without the driver having to monitor the system permanently; however, the driver must be able to take over vehicle guidance within a certain period of time. In fully automated driving (fully autonomous driving mode), the system can automatically handle driving in all situations for a specific case of use; a driver is no longer required for this case of use. The above four levels of automation correspond to SAE levels 1 to 4 of the SAE J3016 standard (SAE—Society of Automotive Engineering). Further, SAE J3016 also provides for SAE level 5 as the highest level of automation, which is not included in the BASt definition. SAE level 5 corresponds to driverless driving, in which the system can automatically handle all situations like a human driver throughout the entire journey.

In the context of this document, the term charging station includes charging stations that are configured to provide electrical energy for charging a vehicle.

The system comprises a backend. The backend can comprise at least one backend server and/or can be part of cloud computing or an IT infrastructure that provides storage space, computing power and/or application software as a service via the Internet (service provider). The backend can comprise backend servers and/or cloud computing or IT infrastructures of one or different service providers.

The system comprises at least one at least partially electrically powered vehicle (referred to hereinafter as vehicle). The vehicle comprises a detection unit configured to detect a faulty operating state of a charging station with respect to a charging operation at the charging station.

For example, the detection unit can be configured to determine a faulty operating state by way of an on-board diagnostic system or vehicle diagnostic system of the vehicle known from the prior art via on-board diagnostics (OBD). With the OBD, an error event can be generated and stored on the vehicle in the event of an identified charging error or charging problem of the charging station.

The faulty operating state of the charging station can include any possible charging fault or any possible charging problem or any possible faulty operating state of the charging post, such as:

charging operation, due to short circuit, not possible at the charging station or aborted; and/or
  hardware in the charging station and/or in the vehicle damaged; and/or
  charging operation aborted due to excessive charging socket temperature; and/or
  charging possible with reduced power; and/or
  mains power too low; and/or
  charging operation not possible or aborted due to error with respect to charging cable; and/or
  charging not possible; and/or
  etc.

The vehicle further comprises a communication unit configured to transmit a message data set comprising the detected faulty operating state of the charging station to the backend.

The communication unit can be a communication unit located in the vehicle that is configured to establish a communication link to other communication subscribers, for example the backend and/or a mobile terminal. The communication unit can comprise a subscriber identity module or SIM card, which is used to set up a communication link via a mobile communications system. The subscriber identity module uniquely identifies the communication unit in the mobile communications network. The communication link can be a data link (for example packet switching) and/or a circuit-based communication link (for example circuit switching). The communication can be performed according to the Cellular Vehicle To X (C-V2X) paradigm according to the LTE standard version 14, the 4G standard, and/or the 5G standard. Furthermore, or alternatively, the communication unit can communicate via another air interface, for example WLAN, independently of the mobile communications network or the availability of sufficient capacities of the currently available mobile communications network. IST-G5 or IEEE 802.11p can be used for this purpose in vehicle-to-vehicle (V2V) communication. The vehicle can thus receive data from other communication subscribers or can transmit data to other communication subscribers via the communication unit.

The message data set can include the identified faulty operating state, for example in the form of the aforementioned OBD fault event. In addition, the message data set can comprise a geographic position of the vehicle at the time the faulty operating state of the charging station is detected. For example, the geographic position of the vehicle can be detected by an on-board navigation system or navigation module. The navigation system can determine or detect current position data using a navigation satellite system to detect or determine the geographic position of the vehicle. The navigation satellite system can be any current or future global navigation satellite system (GNSS) for position determination and navigation by receiving signals from navigation satellites and/or pseudolites. For example, it can be the Global Positioning System (GPS), GLObal NAvigation Satellite System (GLONASS), Galileo, positioning system, and/or BeiDou Navigation Satellite System. In the example of GPS, the navigation system can include a GPS module configured to determine current GPS position data of the vehicle or mobile terminal associated with a vehicle (for example coupled to the vehicle).

The message data set can, for example, be sent to the backend at predefined times, such as every time the vehicle is locked and/or every time the vehicle is started and/or every hour, etc., together with other technical data of the vehicle ("Last State Call").

The backend is configured to use the message data set to determine a unique identification of the charging station having the detected faulty operating state.

Advantageously, it is thus possible for the backend to uniquely identify the charging station at which the faulty operating state was detected on the basis of a standardized OBD charging error event, which is recorded and stored in the vehicle anyway. From a large number of potential charging stations that can be spatially close to each other, such as charging stations at filling stations and rest stops, or in car parks, the backend can perform a unique identification of the charging station at which the faulty operating state was determined. This approach also reports charging error events that only occur during a current charging operation. This increases the reliability of the data with respect to charging stations with faulty operating states.

Preferably, the backend is further configured to provide data relating to the identified charging station having the detected faulty operating state via a points-of-interest, POI, database.

As already explained above, it is known to provide information about charging stations as points-of-interest (POIs) in a database. The POIs can be provided, for example, for navigation devices of vehicles, for smartphone applications or for web-browser-based applications via a website. Thus, the driver of a vehicle can find and drive to a suitable and available charging station when needed. However, due to the lack of standardization and the enormous heterogeneity of charging station operators and providers, there is currently no way to obtain reliable information regarding the operating status of charging posts.

Advantageously, by providing the data relating to the identified charging station having the detected faulty operating state of a POI database through the backend consumer of the POI databases, it is possible to obtain reliable information about the operability of the charging posts. Thus, it is possible for users of at least partially electrically powered vehicles to determine whether the charging station is operational. As a result, charging operations can be carried out with increased probability. In addition, the data relating to the identified charging station having the detected faulty operating state can be used for automated route calculation. Advantageously, users are thus led or routed imperceptibly past inoperable charging stations or charging stations having the detected faulty operating state.

Furthermore or alternatively, by providing the data with reference to the identified charging station having the detected faulty operating state, a global identification of charging infrastructure problems can be made, which also allows conclusions to be drawn about the charging post operators. For example, a ranking of, for example, the ten charging stations per city, market, etc. with the most faulty operating states can be made from the aforementioned provided data, which enables users of at least partially electrically powered vehicles to avoid faulty or non-operational charging stations and thus select operational charging stations for carrying out charging operations. This increases the probability of successful charging operations.

The aforementioned data can also be used by roadside assistance services as well as customer interaction services to prevent the use of faulty or non-operational charging stations.

Preferably, the charging station having the detected faulty operating state is identified uniquely by way of a suitable algorithm.

As explained above, due to a certain inaccuracy or fuzziness in the exact geographic position of the vehicle (the actual geographic position may differ from the geographic position detected by the vehicle by a few meters) and due to the fact that a large number of charging stations are often geographically very close to each other, it is not readily possible to uniquely identify the charging post having the faulty operating state detected by the vehicle. In addition, in OBD event generation there is no link between the OBD error event ("charging error") and the charging post. Therefore, it is necessary to apply a suitable algorithm to uniquely identify the charging station having the detected faulty operating state.

An exemplary algorithm can use geographic positions (latitude, longitude) of charging stations and charging operations as a starting point. The goal of the algorithm is the unique identification of the charging station having the detected faulty operating state. In a first step, per charging operation with detected faulty operating state, the finding of possible charging stations that are located in a predefined radius (for example, all charging stations within a radius of 400-1000 m or of 700-1000 m from the geographic position of the vehicle). A SQL LEFT JOIN is performed over these charging stations using the key or "shortened geographic positions" key). In a next step, a distance between the geographic position of the vehicle at the time of the fault event and the aforementioned possible charging station can be calculated. In a next step, the identification of the charging station with the faulty operating state from the aforementioned possible charging stations with minimum distance takes place.

Furthermore, or alternatively, an exemplary suitable algorithm can include automated assignment using machine learning algorithms for clustering, for example, a Density-Based Spatial Clustering of Applications with Noise (DB-SCAN) algorithm, a k-means algorithm, a k-nearest-neighbor algorithm, etc.

Advantageously, the identification of the charging post with the faulty operating state can thus be determined in a fast and accurate manner based only on the OBD event in combination with the geographic position of the vehicle valid at the time the OBD event is generated.

Preferably, the backend is configured to transmit data relating to the identified charging station having the detected faulty operating state to a navigation system of an at least partially electrically powered vehicle.

For example, the backend can be configured to transmit data relating to the identified charging station having the detected faulty operating state to a navigation system of a plurality of at least partially electrically powered vehicles. For example, the vehicles to which the aforementioned data are transmitted can belong to a fleet of vehicles and/or can be geographically located within a predetermined distance from, or on the route to identified charging posts having the detected faulty operating state, etc.

Advantageously, the data relating to the identified charging station having the detected faulty operating state can be transmitted to vehicles virtually in real time, so that this charging station is no longer approached by vehicles for charging the vehicle or so that the driver of the vehicle is able to select an alternative charging station for charging the vehicle.

Preferably, a navigation system of a second vehicle is configured to take into account the detected faulty operating state of the identified charging station when navigating the second vehicle.

For example, the navigation system of a second vehicle can be configured to ignore the identified charging station having the detected faulty operating state when e-routing or routing at least partially electrically powered vehicles. Advantageously, this increases the probability of successful charging operations.

According to a second aspect, the underlying object is achieved by a method for robustly detecting faulty operating states of charging stations, comprising:

> detecting, via a detection unit of a vehicle, a faulty operating state of a charging station with respect to a charging operation at the charging station;

> transmitting, via a communication unit of the vehicle, a message data set comprising the detected faulty operating state of the charging station to a backend; and > determining, via the backend, a unique identification of the charging station (150) having the detected faulty operating state.

> Preferably, the method comprises:

> providing, via the backend, data relating to the identified charging station having the detected faulty operating state via a points-of-interest, POI, database.

> Preferably, the unique identification of the charging station having the detected faulty operating state is performed by way of a suitable algorithm.

> Preferably, the method comprises:

> transmitting, via the backend, data relating to the identified charging station having the detected faulty operating state to a navigation system of an at least partially electrically powered vehicle.

> Preferably, a navigation system of a second vehicle is configured to take into account the detected faulty operating state of the identified charging station when navigating the second vehicle.

These and other tasks, features and advantages of the present invention will become clear from a study of the following detailed description of preferred embodiments and the accompanying figures. It will be seen that, although embodiments are described separately, individual features thereof can be combined to form additional embodiments.

BRIEF DESCRIPTION OF THE DRAWINGS

FIG. 2 shows an exemplary method for robustly detecting faulty operating states of charging stations.

DETAILED DESCRIPTION OF THE DRAWINGS

Figure 1:
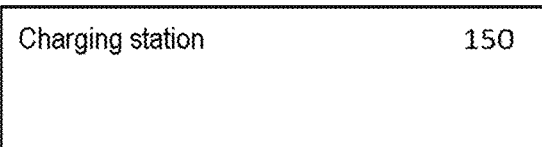
FIG. 1 schematically shows a system for robustly detecting faulty operating states of charging stations.
Figure 1:
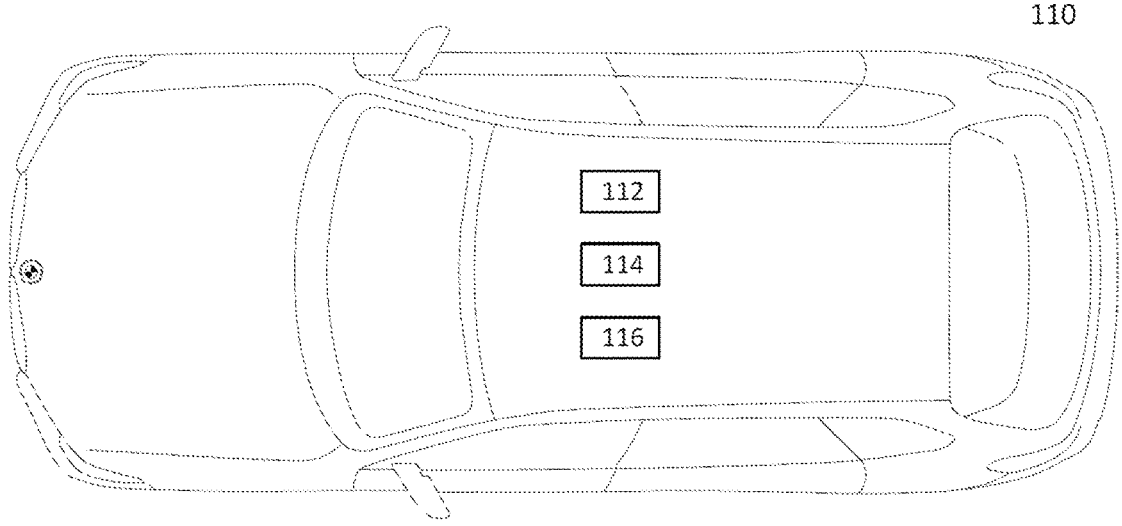
Figure 1:
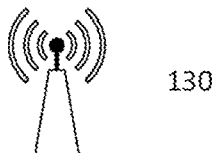
Figure 1:
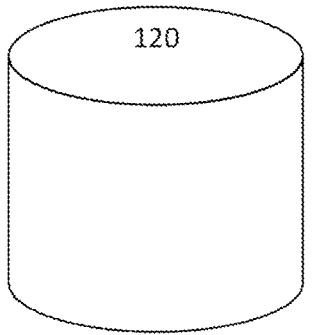

FIG. 1 schematically illustrates a system 100 for robustly detecting faulty operating states of charging stations that are configured to provide electrical power for charging an at least partially electrically powered vehicle 110.

The system 100 comprises a backend 120. The backend 120 can comprise at least one backend server and/or can be part of cloud computing or an IT infrastructure that provides storage space, computing power, and/or application software as a service over the Internet (service provider). The backend 120 can comprise backend servers and/or cloud computing or IT infrastructures of one or different service providers.

The system 100 comprises an at least partially electrically powered vehicle 110 in which an electrical energy storage device can be charged using a charging station 150. The charging station 150 is configured to provide electrical energy for charging at least partially electrically powered vehicles 110.

The vehicle 110 comprises a detection unit 112 configured to detect a faulty operating state of a charging station 150 with respect to a charging operation at the charging station 150.

For example, the detection unit 112 can be configured to determine a faulty operating state by way of an on-board diagnostic system or vehicle diagnostic system of the vehicle known from the prior art via on-board diagnostics (OBD). With the OBD, an error event can be generated and stored on the vehicle in the event of an identified charging error or charging problem of the charging station.

The vehicle 110 further comprises a communication unit 114 configured to transmit a message data set comprising the detected faulty operating state of the charging station 150 to the backend 120.

The communication unit 114 can be a communication unit located in the vehicle 110 that is configured to establish a communication link to other communication subscribers, for example the backend 120 and/or a mobile terminal. The communication unit 114 can comprise a subscriber identity module or SIM card, which is used to set up a communication link via a mobile communications system 130. The subscriber identity module uniquely identifies the communication unit in the mobile communications network. The communication link can be a data link (for example packet switching) and/or a circuit-based communication link (for example circuit switching). The communication can be performed according to the Cellular Vehicle To X (C-V2X) paradigm according to the LTE standard version 14, the 4G standard, and/or the 5G standard. Furthermore, or alternatively, the communication unit can communicate via another air interface, for example WLAN, independently of the mobile communications network or the availability of sufficient capacities of the currently available mobile communications network. IST-G5 or IEEE 802.11p can be used for this purpose in vehicle-to-vehicle (V2V) communication. The vehicle 110 can thus receive data from other communication subscribers or can transmit data to other communication subscribers via the communication unit 114.

The message data set can include the identified faulty operating state of the charging station 150, for example in the form of the aforementioned OBD fault event. In addition, the message data set can comprise a geographic position of the vehicle 110 at the time the faulty operating state of the charging station 150 is detected. For example, the geographic position of the vehicle can be detected by an on-board navigation system or navigation module 116. The navigation system 116 can determine or detect current position data using a navigation satellite system to detect or determine the geographic position of the vehicle 110. The navigation satellite system can be any current or future global navigation satellite system (GNSS) for position determination and navigation by receiving signals from navigation satellites and/or pseudolites. For example, it can be the Global Positioning System (GPS), GLObal NAvigation Satellite System (GLONASS), Galileo, positioning system, and/or BeiDou Navigation Satellite System. In the example of GPS, the navigation system 116 can include a GPS module configured to determine current GPS position data of the vehicle 110 or mobile terminal associated with a vehicle (for example coupled to the vehicle).

The message data set can, for example, be sent to the backend 120 at predefined times, such as every time the vehicle 110 is parked or locked and/or every time the vehicle 110 is started and/or every hour, etc., together with other technical data of the vehicle 110 ("Last State Call").

The backend 120 is configured to use the message data set to determine a unique identification of the charging station 150 having the detected faulty operating state.

It is possible, using a suitable algorithm, for the backend 120 to uniquely identify the charging station 150 having the detected faulty operating state.

As explained above, due to a certain inaccuracy or fuzziness in the exact geographic position of the vehicle 110 at the time of the OBD charging error event (the actual geographic position can differ from the geographic position detected by the vehicle 110 by a few meters) and due to the fact that a large number of charging stations are often geographically very close to each other, it is not readily possible to uniquely identify the charging post 150 having the faulty operating state detected by the vehicle 110. In addition, in OBD event generation there is no link between the OBD error event ("charging error") and the charging post 150 at which the fault event has occurred. Therefore, it is necessary to apply a suitable algorithm to uniquely identify the charging station having the detected faulty operating state.

An exemplary algorithm can use geographic positions (latitude, longitude) of charging stations and charging operations as a starting point. The goal of the algorithm is the unique identification of the charging station 150 having the detected faulty operating state. In a first step, per charging operation with detected faulty operating state, the finding of possible charging stations that are located in a predefined radius (for example, all charging stations within a radius of 400-1000 m or of 700-1000 m from the geographic position of the vehicle). A SQL LEFT JOIN is performed over these charging stations using the key or "shortened geographic positions" key. In a next step, a distance between the geographic position of the vehicle 110 at the time of the fault event and the aforementioned possible charging station can be calculated. In a next step, the identification of the charging station 150 with the faulty operating state from the aforementioned possible charging stations with minimum distance takes place.

Furthermore, or alternatively, an exemplary suitable algorithm can include automated assignment using machine learning algorithms for clustering, for example a Density-Based Spatial Clustering of Applications with Noise (DB-SCAN) algorithm, a k-means algorithm, a k-nearest-neighbor algorithm, etc.

Advantageously, the identification of the charging post 150 with the faulty operating state can thus be determined in a fast and accurate manner based only on the OBD event in combination with the geographic position of the vehicle 110 valid at the time the OBD event is generated.

Advantageously, it is thus possible, on the basis of a standardized OBD charging error event, which is stored in the vehicle anyway, for the backend to uniquely identify, from a large number of potential charging stations that may be spatially close to one another, such as charging stations at filling and service stations, or in car parks, the charging post at which the faulty operating state was determined.

The backend 120 can further be configured to transmit data relating to the identified charging station having the detected faulty operating state via a points-of-interest, POI, database.

As already explained above, it is known to provide information about charging stations as points-of-interest (POIs) in a database. The POIs can be provided, for example, for navigation devices of vehicles, for smartphone applications or for web-browser-based applications via a website. Thus, the driver of a vehicle can find and drive to a suitable and available charging station for charging an electric energy storage device of the vehicle when needed. However, due to the lack of standardization and the enormous heterogeneity of charging post operators and providers, there is currently no way to obtain reliable information regarding the operating status of charging posts.

Advantageously, by providing the data relating to the identified charging station 150 having the detected faulty operating state of a POI database, the backend 120 enables consumers (in-vehicle navigation systems, navigation apps, etc.) of the POI databases to obtain reliable information about the operability of the charging posts. Thus, it is possible for users of at least partially electrically powered vehicles to determine whether a charging station is operational. As a result, charging operations can be carried out with increased probability.

Furthermore or alternatively, the backend 120 can be configured to transmit data relating to the identified charging station 150 having the detected faulty operating state to a navigation system of an at least partially electrically powered vehicle.

For example, the backend 120 can be configured to transmit data relating to the identified charging station having the detected faulty operating state to a navigation system of a plurality of at least partially electrically powered vehicles. For example, the vehicles to which the aforementioned data are transmitted can belong to a fleet of vehicles and/or can be geographically located within a predetermined distance from the identified charging station 150 having the detected faulty operating state, etc.

Advantageously, the data relating to the identified charging station 150 having the detected faulty operating state can be transmitted to vehicles virtually in real time, so that this charging station is no longer approached by vehicles for charging the vehicle or so that the driver of the vehicle is able to select an alternative charging station for charging the vehicle.

The navigation system of a second vehicle can be configured to take into account the detected faulty operating state of the identified charging station 150 when navigating the second vehicle.

For example, the navigation system of a second vehicle can be configured to ignore the identified charging station 150 having the detected faulty operating state when e-routing or routing at least partially electrically powered vehicles. Advantageously, this increases the probability of successful charging operations.

FIG. 2 illustrates an exemplary method 200 for robustly detecting faulty operating states of charging stations configured to provide electrical power for charging an at least partially electrically powered vehicle 110. The method 200 can be performed by a system 100 as described with reference to FIG. 1.

The method 200 comprises:

detecting 210, via a detection unit 112 of a vehicle 110, a faulty operating state of a charging station 150 with respect to a charging operation at the charging station 150;

transmitting 220, via a communication unit 114 of the vehicle 110, a message data set comprising the detected faulty operating state of the charging station 150 to a backend 120; and determining 230, via the backend 120, a unique identification of the charging station 150 having the detected faulty operating state.

The method 200 can further comprise:

providing 240, via the backend 120, data relating to the identified charging station 150 having the detected faulty operating state via a points-of-interest, POI, database.

The unique identification of the charging station 150 having the detected faulty operating state can be performed by way of a suitable algorithm.

The method can further comprise:

transmitting 250, via the backend 120, data relating to the identified charging station 150 having the detected faulty operating state to a navigation system 116 of an at least partially electrically powered vehicle.

A navigation system of a second vehicle can be configured to take into account the detected faulty operating state of the identified charging station 150 when navigating second vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for detecting faulty operating states of charging stations, the system comprising:

a backend; and an at least partially electrically powered vehicle, comprising:

a detection unit configured to detect a faulty operating state of a charging station with respect to a charging operation at the charging station; and a communication unit configured to transmit a message data set comprising the detected faulty operating state of the charging station to the backend;

wherein the backend is configured to use the message data set to determine a unique identification of the charging station having the detected faulty operating state.

2. The system according to claim 1, wherein the backend is further configured to provide data relating to the charging station having the detected faulty operating state via a points-of-interest database.

3. The device according to claim 1, wherein the charging station having the detected faulty operating state is identified uniquely by an algorithm.

4. The device according to claim 1, wherein the backend is further configured to transmit data relating to the charging station having the detected faulty operating state to a navigation system of a second at least partially electrically powered vehicle.

5. The device according to claim 4, wherein the navigation system of the second vehicle is configured to take into account the detected faulty operating state of the identified charging station when navigating the second vehicle.

6. A method for detecting faulty operating states of charging stations, the method comprising:

detecting, via a detection unit of a vehicle, a faulty operating state of a charging station with respect to a charging operation at the charging station;

transmitting, via a communication unit of the vehicle, a message data set comprising the detected faulty operating state of the charging station to a backend; and determining, via the backend, a unique identification of the charging station having the detected faulty operating state.

7. The method according to claim 6, further comprising:

providing, via the backend, data relating to the charging station having the detected faulty operating state via a points-of-interest database.

8. The method according to claim 6, wherein the unique identification of the charging station having the detected faulty operating state is performed by means of an algorithm.

9. The method according to claim 6, further comprising:

transmitting, via the backend, data relating to the charging station having the detected faulty operating state to a navigation system of a second at least partially electrically powered vehicle.

10. The method according to claim 9, wherein the navigation system of the second vehicle is configured to take into account the detected faulty operating state of the identified charging station when navigating the second vehicle.

* * * * *